United States Patent [19]

Loring, David A.

[11] Patent Number: 4,628,976
[45] Date of Patent: Dec. 16, 1986

[54] WOOD SURFACING BLADE

[76] Inventor: Loring, David A., 5257 Radford Ave., #202, North Hollywood, Calif. 91607

[21] Appl. No.: 746,725

[22] Filed: Jun. 20, 1985

[51] Int. Cl.$^4$ ............................................. B27G 13/00
[52] U.S. Cl. ..................... 144/241; 83/840; 83/842; 144/117 R; 144/230; 407/53
[58] Field of Search ............... 407/11, 113, 114, 115, 407/120, 53, 54; 144/218, 219, 230, 229, 241, 117 B, 130; 408/199; 83/840, 841, 842, 845

[56] References Cited

U.S. PATENT DOCUMENTS

| Re. 7,021 | 3/1876 | Disston | 83/842 |
|---|---|---|---|
| 54,827 | 5/1886 | Woodrough | 83/841 |
| 63,024 | 5/1867 | Disston | 83/842 |
| 177,446 | 5/1876 | Adams | 83/845 |
| 363,753 | 5/1887 | Mahaffey | 144/229 |
| 579,383 | 3/1897 | Coyle | 83/840 |
| 709,786 | 4/1901 | Lloyd | 83/840 |
| 725,469 | 4/1903 | Miner | 83/840 |
| 797,947 | 8/1905 | Dilks | 83/840 |
| 2,239,615 | 4/1941 | Melde | 144/230 |
| 3,803,950 | 4/1974 | Wasser | 407/53 |
| 4,384,600 | 5/1983 | Kivimaa | 144/230 |

Primary Examiner—W. D. Bray
Attorney, Agent, or Firm—Marvin E. Jacobs

[57] ABSTRACT

A blade for use in shapers, planers, and the like for the shaping and surface finishing of wood. In contrast to prior art blade shapes wherein a sharpened cutting edge is scraped across the wood resulting in rapid wear of and damage to the blade, the present blade provides a cutting edge which enters the surface of the wood in a shallow chisel-like cutting action. The force on the point is along a line with maximum material behind it to prevent most damage to the cutting. The heel portion of the blade can provide a burnishing action on the surface of the wood so as to eliminate irregularities while, at the same time, resisting any frictional burning of the wood's surface.

12 Claims, 13 Drawing Figures

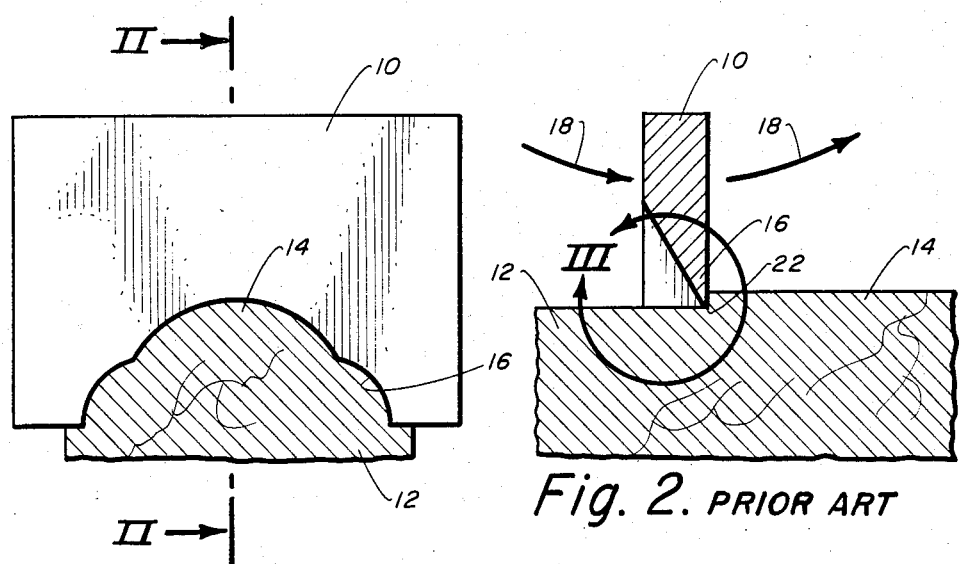
Fig. 1. PRIOR ART
Fig. 2. PRIOR ART
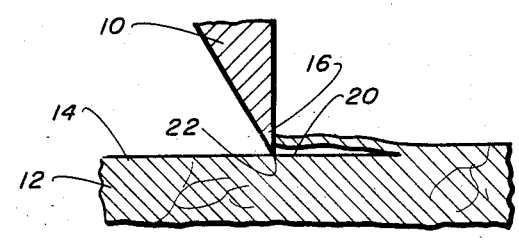
Fig. 3. PRIOR ART
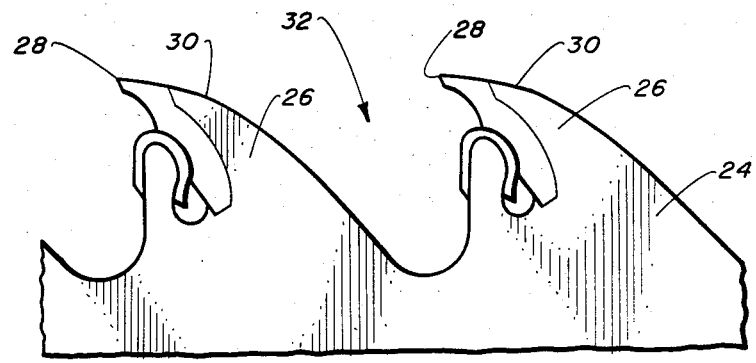
Fig. 4. PRIOR ART
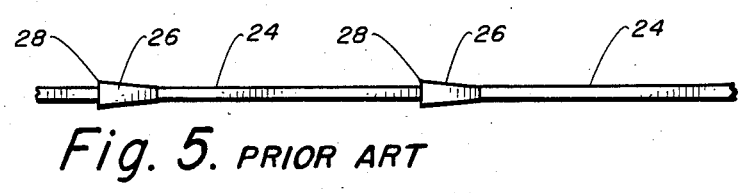
Fig. 5. PRIOR ART

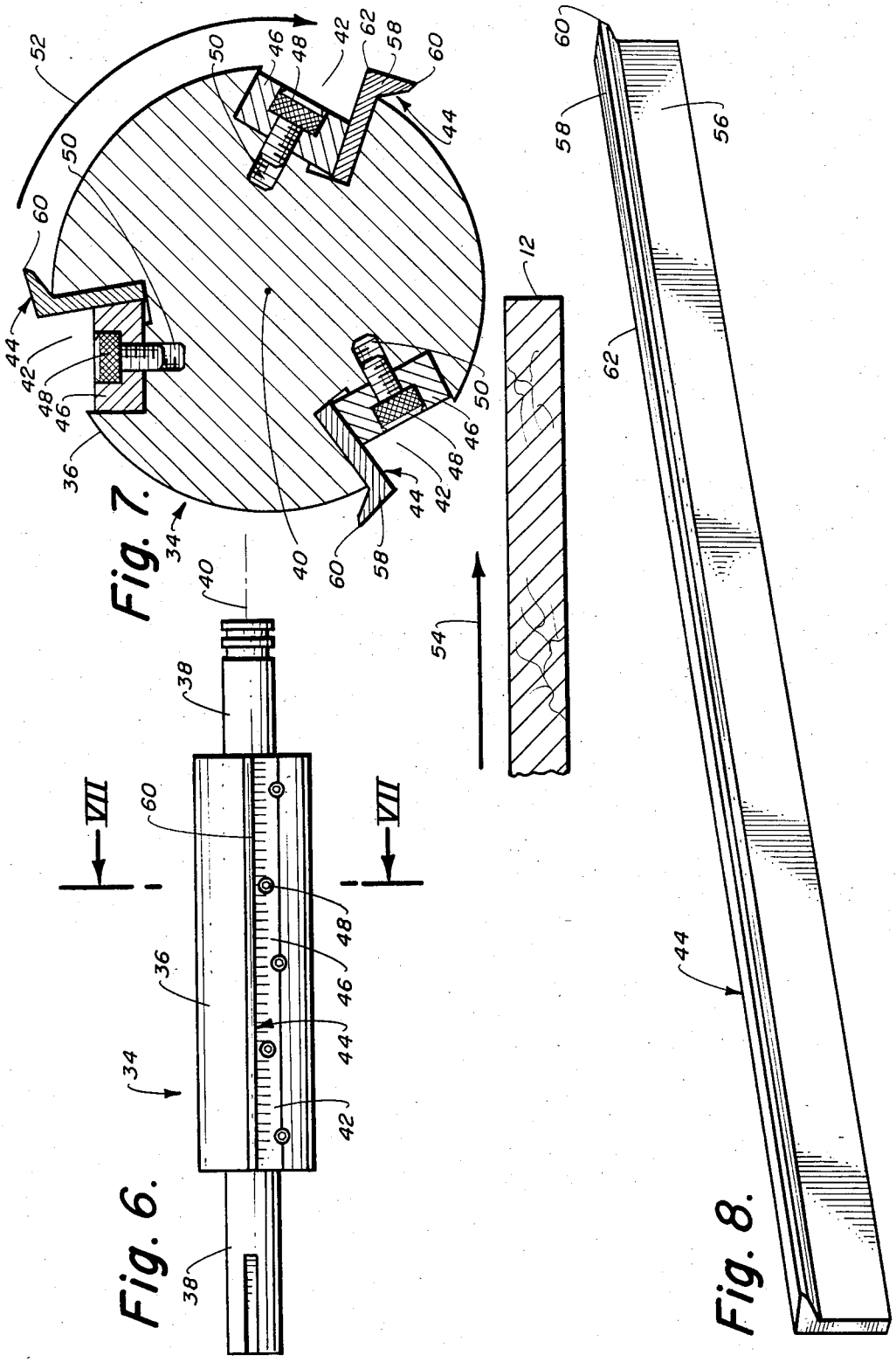

WOOD SURFACING BLADE

TECHNICAL FIELD

The present invention relates to wood cutting blades and, more particularly, to a wood cutting blade for use in rotating machinery to shape and surface finish wood wherein the cutting blade comprises cutting means for cutting an arcuate segment from the surface of the wood at the point of contact and, optionally, can contain burnishing means for burnishing and smoothing any irregularities extending upward from the surface of the wood more than a pre-established minium amount at the point of contact.

DESCRIPTION OF THE ART

Wood cutting and shaping blades have been known in the art for a great length of time. Basically, such blades fall into two broad categories—blades for shaping and surfacing wood and blades for cutting through wood. An example of the former according to the prior art is shown in FIGS. 1–3 while an example of the latter according to the prior art is shown in FIGS. 4–5. Such blades are also used on materials having similar properties to wood, but for purposes of simplification, only "wood" will be referred to herein.

The present invention is directed to the surfacing and shaping of wood in the manner of the prior art blades of FIGS. 1–3. The particular blade of FIGS. 1–3, generally indicated as 10, is a sharper blade such as used to make moldings, and the like. The description which follows relative thereto, however, is equally applicable to prior art blades used in planers, joiners, and many woodworking tools.

Rather than being a dynamic and growing art, the woodworking art as it relates to such blades has been, at best, a static art. The craftsmen who knew how to hand fashion, grind, and maintain the cutting blades used in woodworking machinery have all but disappeared, without passing on their craft to a new generation. Technological achievement in the field of woodworking blades has been in the use of improved materials, such as carbide, at the cutting point.

The problem can best be understood with reference to FIGS. 1–3. Blade 10 is rotated in a head (not shown). As blade 10 rotates, wood strip 12 is moved past blade 10 at a fixed distance, as established by a guide (also not shown). The surface at 14 is shaped and surface finished to produce a molding by the "cutting" edge 16 of rotating blade 10. In this regard, the term "cutting" is really a misnomer. As shown in FIG. 2, as the blade 10 rotates along its circular path of rotation 18, the cutting edge 16 scrapes across the surface 14 of wood strip 12 at substantially right angles thereto along the grain of the wood. Moreover, as shown in greater detail in the enlarged drawing of FIG. 3, the sharp cutting edge 16 can, and does, actually fracture and split the wood 12 along a line, such as 20, in advance of the point of contact at 22. The result is a non-smooth surface. This is particularly true with harder woods such as maple. Recognizing this fact, the woodworking craftsmen who ground their own blades kept separate blades for the hard woods wherein they had actually ground off the sharp cutting edge 16 to dull it, thereby forcing a scraping action which tended to avoid catching and splitting of the wood ahead of the point of contact as depicted in FIG. 3.

As can be readily appreciated, by contacting the wood 12 at a single unsupported point of scraping contact, as best seen in FIG. 3, the cutting edge 16 of prior art blade 10 is quite prone to rapid dulling and chipping. Chipping, of course, because of the scraping mode of movement across the surface 14 of wood 12, results in ridges running longitudinally along the surface 14 which was intended to be smoothed.

Cutting blades, such as that generally indicated as 24 in FIGS. 4 and 5, are designed to saw through wood—both with the grain and across it. They are not particularly designed for producing smoothness but, rather, to possess strength and the ability to pass through a saw cut and not bind. To this end, the teeth 26 are either broader at the tip 28, as in the example of FIGS. 4–5, or are "set" or offset alternately to one side and the other about the periphery (or along the length of the blade or saw in the case of bandsaws, handsaws, and the like). In either case, the object is the same, to provide a point of chipping contact and then quickly remove the remainder of the blade from contact with the wood to prevent clogging of the cut and binding of the blade. Thus, as can be seen in FIG. 4, each tooth 26 drops off rapidly along the back portion 30 from the chipping tip 28 to form a deep depression 32 in front of and beneath the next succeeding tooth 26 into which the wood chips being chipped from the wood can be contained during the tooth's passage through the wood to prevent packing and binding. While blades such as 24 do provide a chipping action as opposed to a scraping action, as those skilled in the art well know as from, for example dado blades, a plurality of blades such as 24 mounted side by side to form a wide composite blade for making slots, and the like, will not produce a smooth surface. Thus, making a wide blade formed like blade 24 of FIGS. 4–5 would not result in a blade suitable for the purposes of the shaping and surfacing blade 10 of FIGS. 1–3.

STATEMENT OF THE INVENTION

The present invention provides a cutting blade for all wood shaping and surfacing applications which incorporates a cutting rather than a scraping or chipping action, resists damage to the cutting edge, is long lived with respect to its sharpness, and which produces a smooth finish on the wood.

The blade of the present invention is adapted for use in machinery with cutters moving in a rotary path to shape and surface finish wood wherein the wood is moved through the machinery along a path normal to and offset from the rotation axis of a rotating member containing the blade at its outer periphery to contact the wood wherein the blade is of a hard, sharpenable material and comprises cutting means for rotation in a circular path as the rotating member rotates and for cutting an arcuate segment from the surface of the wood at the point of contact as the cutting means rotates. The blade may also contain burnishing means for rotation in combination with the cutting means to contact wood passing by after being cut by the cutting means, the burnishing means being disposed to move along a circle of rotation of slightly smaller radius than the circle of rotation of the cutting means for burnishing and smoothing any irregularities extending upward from the surface of the wood more than a pre-established minimum amount at the point of contact without contacting the wood's surface sufficiently to cause frictional burning thereof. The burnishing edge does not always provide burnishing depending on the wood species, water content of the wood and the fluctuations in settings and tolerances of each individual machine.

In the preferred embodiment, the cutting means includes a chisel-shaped cutting edge facing in the direction of rotation and disposed to contact wood passing by at an acute angle with respect to the surface of the wood whereby as the cutting means rotates the cutting edge cuts an arcuate segment from the surface of the wood at the point of contact. Additionally in the preferred embodiment, the burnishing means comprises an edge formed by two surfaces meeting at substantially right angles such that contact between the burnishing edge and the wood is along a line point of contact.

These and many other features and attendant advantages of the invention will become apparent as the invention becomes better understood by reference to the following detailed description when considered in conjunction with the accompanying drawings.

BRIEF DESCRIPTION OF THE DRAWINGS

FIG. 1 is an end view cutaway through a strip of wood passing by a shaper blade to form a molding.

FIG. 2 is a cutaway view through a portion of the blade and wood of FIG. 1 in the plane II—II.

FIG. 3 is an enlarged view of the drawing of FIG. 2 in the area designated as III.

FIG. 4 is a side view of a portion of the periphery of a wood cutting saw blade.

FIG. 5 is a top view of the portion of the blade of FIG. 4.

FIG. 6 is a top view of a rotating member from a planer having a blade according to the present invention mounted therein.

FIG. 7 is a cutaway enlarged drawing through the member of FIG. 6 in the plane VII—VII and showing the mounting of three blades according to the present invention equally spaced about the periphery thereof.

FIG. 8 is a perspective drawing of one of the blades of FIGS. 6–7 removed from the rotating member.

DETAILED DESCRIPTION OF THE INVENTION

Figure 9:
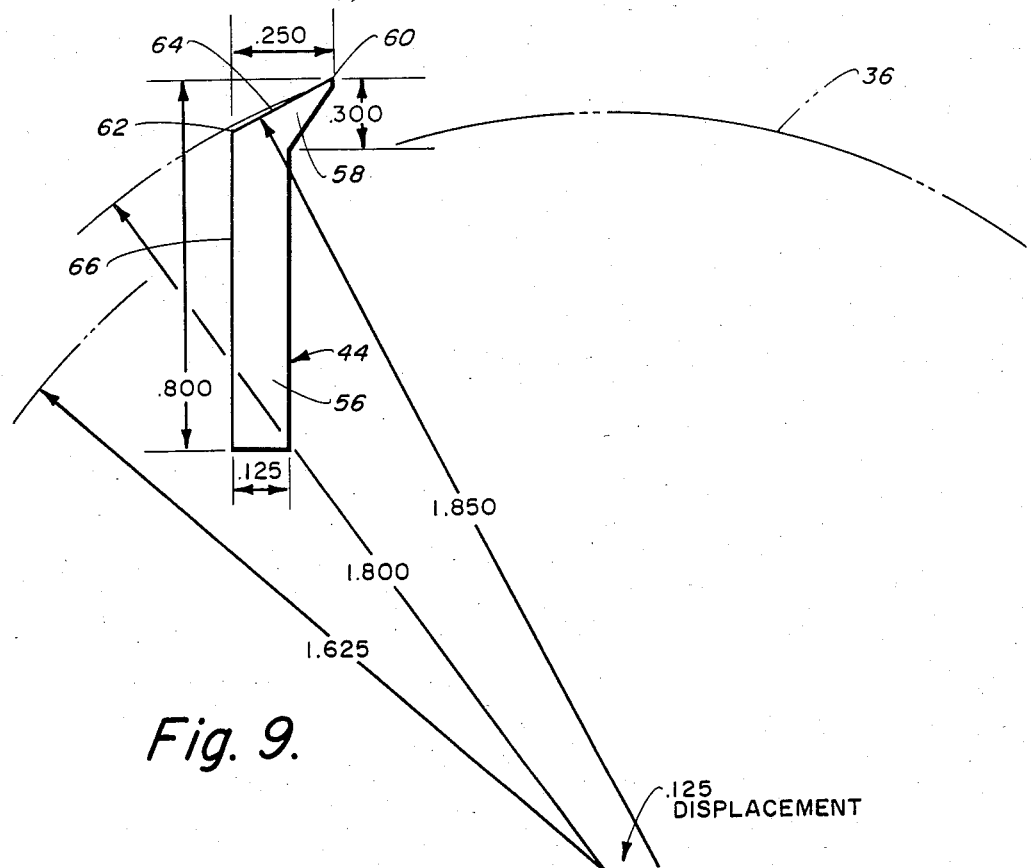
FIG. 9 is a simplified drawing of a portion of the member and blade of FIG. 7 in an end view showing the dimensions of a tested embodiment and the manner of mounting to obtain the benefits thereof.

Turning now to FIGS. 6–12, the blade of the present invention will be described with respect to a planer blade as built and tested. It is to be understood that the unique cross-sectional configuration of the blade as hereinafter described can be used for any blade of similar use and with materials of similar nature to wood in their requirements for shaping and smoothing. The description that follows and the amended claims are intended to cover all such applications and not to be limited to the specific example which follows hereinafter.

Depicted in top view in FIG. 6 is the rotating member 34 from a planer (not shown). Member 34 comprises a cylindrical center portion 36 from which shafts 38 extend along a common axis of rotation 40. As best seen in the cross-sectional view of FIG. 7, the center portion has three longitudinal grooves 42 disposed at equal radial distances about its surface. Two or three is typical for the particular device being described. Other devices may employ one groove for one blade, more grooves for more blades, or eliminate the grooves and form the blade into the member itself. The latter would be particularly true for smaller, hand-held, motor driven woodworking devices. For purposes of the description, however, three grooves 42 are shown, each containing a blade 44 according to the present invention as shown in perspective in FIG. 8. The blades 44 being described are adapted to fit in the same center portion 36 as used for the prior art blades described above with respect to FIGS. 1–3, so that conversion is an easy matter. The blades 44 are held firmly in the grooves 42 by the wedging action of gibs 46 when bolts 48 are forced against the bottom of the channel, which are threaded into bores 50 in portion 36.

As shown in FIG. 7, the member 34 is rotated in the direction of arrow 52 on shafts 38 about axis 40 by means which are not shown. As the member 34 rotates, the blades 44 are rotated therewith in a circular path. Wood 12 is moved past the rotating member 34 and blades 44 along a line, represented by arrow 54, which is normal to and displaced from the axis of rotation 40 of the member 34. The relationship of the parts and the cutting/burnishing action achieved thereby will now be described in detail.

The tested embodiment and its dimensions are shown in FIG. 9. The blade shown was made for and tested in a twelve inch thickness planer manufactured by Woodmaster Tools, Inc. of Kansas City, Missouri. The blade 44 was twelve inches long. In cross-section, it was 0.800 inches in maximum length and 0.250 inches in maximum thickness. As with any cutting blade, the blade 44 of the present invention must be of a hard, sharpenable material. In the tested embodiment being described, the material used was 0-1 Tool steel, with a Rockwell hardness of 56-58 on the C scale. The blade 44 comprises a radial member 56 which is .125 in thickness. It is the radial member 56 which is carried by the cylindrical center portion 36 or rotating member 34 and which extends more or less radially outward with a cutting member 58 at its outer end and at substantially right angles thereto. The radial member 56 and cutting member 58 in combination form what could be described as a hammer shape. The cutting member 58 comprises the head of the "hammer" and has a cutting edge 60 extending in the direction of rotation. As a result of the hammer shape, a maximum amount of material is in alignment with the cutting edge 60 so as to give it the structural support necessary to resist chipping and breaking. The opposite edge from the cutting edge 60 is a burnishing edge 62 formed where the outer surface 64 of the cutting member 58 meets the back side 66 of the cutting member 58 at right angles. This will be pursued in greater detail shortly.

Figure 10:
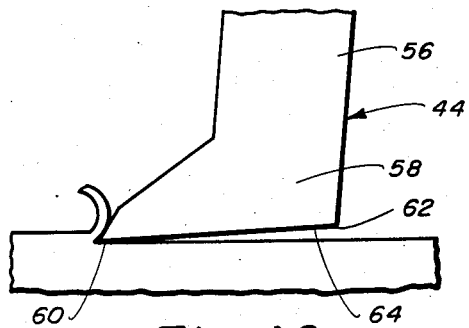
FIG. 10 is a simplified drawing showing the cutting action of the blade of the present invention.
Figure 11:
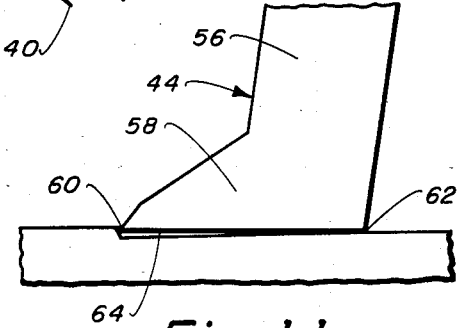
FIG. 11 is a simplified drawing showing the burnishing action of the blade of the present invention.
Figure 12:
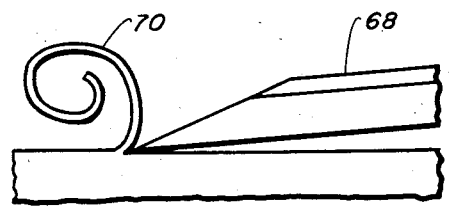
FIG. 12 is a simplified drawing showing how the blade of the present invention cuts in the same manner as a wood chisel.
Figure 13:
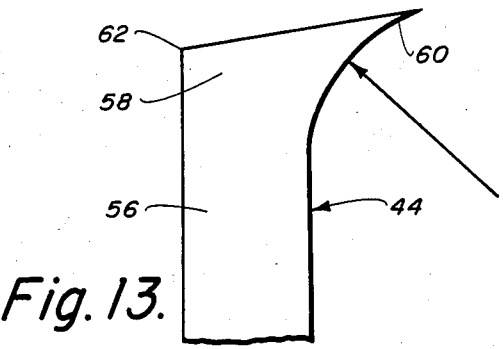
FIG. 13 is a simplified drawing showing an alternate embodiment for the cutting edge of the present invention.

As can be seen in FIGS. 10 and 12, the cutting edge 60 is chisel-shaped in a similar fashion to the wood chisel 68 of FIG. 12. Investigation has shown that the chisel-shaped cutting edge 60 of the blade 44 of the present invention cuts an arcuate segment from the wood at its point of contact with the wood being shaped and finished which is similar to the wood curl 70 produced by the wood chisel 68 of FIG. 12. To achieve this arcuate cutting action, the cutting edge 60 in the tested embodiment had an initial portion at about 45 degrees to the surface of the wood followed by a portion at about 35 degrees. As thus configured, rather than the right angled scraping action of the prior art as described above, the cutting edge 60 of the present invention is disposed to contact the wood at an acute cutting angle employed in using a wood chisel such as that shown in FIG. 12. While the cutting edge 60 of the tested embodiment was formed by a 45 degree initial portion followed by a 35 degree portion ground in the manner of the chisel 68 of FIG. 12, a similar "chisel-shaped" cutting edge can be formed by grinding it arcuately in the manner shown in the alternate embodiment of FIG. 13.

Returning to FIG. 9 with particularity, it can be seen that the portion 36 had a radius of 1.625 inches. The cutting edge 60, was positioned to have a radius of its circle of rotation of 1.800 inches. To achieve the desired burnishing action, the outer surface 64 was sloped by disposing it on a radius line of length 1.850 inches displaced horizontally with respect to the blade 44 by the thickness of the radial member 56, or 0.125 inches. This resulted in just enough slope between the cutting edge 60 and the burnishing edge 62 that as the blade 44 rotates, the cutting edge 60 cuts an arcuate segment from the wood as shown in FIG. 10 as it rotates upward. Simultaneously, the burnishing edge 62 is rotating downward with respect to the surface of the wood to the position of FIG. 11 wherein the burnishing edge 62 formed by the right angled junction of the surfaces 64, 66, as described above, contacts the surface of the wood in a line point of contact along a circle of rotation with a radius just slightly smaller than that of the cutting edge 60. As a result, any raised irregularities in the surface produced by the cutting edge 60 which are greater than the difference between the two radii of the respective circles of rotation, are flattened by the burnishing action of the burnishing edge 62. In the tested embodiment, for example, the difference between the circle of rotation of the cutting edge 60 and the burnishing edge 62 was in the 0.005–0.010 inch range. As a result, the finished surface produced by the blade of the present invention had no surface irregularities higher than 0.010 (worst case), which is well within tolerance limits for what is considered a smoothly finished surface. Furthermore, it was found that the cutting action of the blade cut cleanly even in woods such as rock maple without any gouging or chipping action resulting in surface pocking or indenting as the result of wood being pulled from the surface, as was the case with the prior art blades. Moreover, with both soft woods and hard woods it was found that the slope, clearance, and single line contact point of the burnishing edge 62 produced no frictional burning of the wood's surface.

Thus, it can be seen from the foregoing description that the blade of the present invention has met its desired objectives by providing a true design advancement in the field of woodworking blades.

Though the blade of the invention has been in a straight configuration, it can also be made in other shapes such as helical for shapers, planers, jointers, etc. In the embodiment in which the blade contains an edge for burnishing, the burnishing edge can contain a layer of bonded abrasive particles. This layer can be used for sanding the wood piece.

It is to be realized that only preferred embodiments of the invention have been described and that numerous substitutions, modifications, and alterations are permissible without departing from the spirit and scope of the invention as defined in the following claims.

I claim:

1. A surfacing blade for use in rotating machinery to surface finish wood wherein the wood is moved through the machinery along a path normal to and offset from the rotation axis of a rotating member containing said blade at its outer periphery to contact the wood, said blade being a unitary blade of an elongated piece of a hard, sharpenable material and comprising:
   (a) a radial portion adapted to be carried horizontally by and extending radially outward from the rotating member in a plane parallel to the rotational axis of the rotating member; and,
   (b) a cutting portion disposed along the outer edge of said radial portion to be rotated in a circular path as the rotating member rotates, said cutting portion being disposed substantially at right angles to said radial portion and having an elongated chisel-shaped cutting edge along the edge facing in the direction of rotation and disposed to contact wood passing by at an acute angle with respect to the surface of the wood such that as said blade rotates said cutting edge cuts an elongated arcuate segment from the surface of the wood at the point of contact.

2. A blade for use in rotating machinery to shape and surface finish wood wherein the wood is moved through the machinery along a path normal to and offset from the rotation axis of a rotating member containing said blade at its outer periphery to contact the wood, said blade being of a hard, sharpenable material and comprising:
   a. a radial member carried by and extending radially outward from the rotating member along a line substantially normal to the rotational axis thereof; and,
   b. a cutting member carried by said radial member at an outer end thereof to be rotated in a circular path as the rotating member rotates, said cutting member having a chisel-shaped cutting edge along the edge facing in the direction of rotation and disposed to contact wood passing by at an acute angle with respect to the surface of the wood whereby as said blade rotates said cutting edge cuts an arcuate segment from the surface of the wood at the point of contact, said cutting member further having a burnishing edge along the edge facing opposite the direction of rotation and disposed to contact wood passing by after being cut by said cutting edge, said burnishing edge moving along a circle of rotation of slightly smaller radius than the circle of rotation of said cutting edge whereby as said blade rotates said burnishing edge smooths any irregularities extending upward from the surface of the wood more than a pre-established minimum amount at the point of contact without contacting the wood's surface sufficiently to cause frictional burning thereof.

3. The blade of claim 2 wherein said burnishing edge is formed at the edge of two surfaces meeting at substantially right angles such that contact between said burnishing edge and the wood is along a line point of contact.

4. A blade for use in rotating machinery to shape and surface finish wood wherein the wood is moved through the machinery along a path normal to and offset from the rotation axis of a rotating member containing said blade at its outer periphery to contact the wood, said blade being of a hard, sharpenable material and comprising:
   a. cutting means for rotation in a circular path as the rotating member rotates and for cutting an arcuate segment from the surface of the wood at the point of contact as said cutting means rotates; and,
   b. burnishing means for rotation in combination with said cutting means to contact wood passing by after being cut by said cutting means, said burnishing means being disposed to move along a circle of rotation of slightly smaller radius than the circle of rotation of said cutting means for burnishing and smoothing any irregularities extending upward from the surface of the wood more than a pre-established minimum amount at the point of contact without contacting the wood's surface sufficiently to cause frictional burning thereof.

5. The blade of claim 4 wherein said cutting means includes a chisel-shaped cutting edge facing in the direction of rotation and disposed to contact wood passing by at an acute angle with respect to the surface of the wood whereby as said cutting means rotates said cutting edge cuts an arcuate segment from the surface of the wood at the point of contact.

6. The blade of claim 4 wherein said burnishing means comprises an edge formed by two surfaces meeting at substantially right angles such that contact between said burnishing edge and the wood is along a line point of contact.

7. In an elongated surfacing blade where the blade is a strip of a hard, sharpenable material for use in rotating machinery such as surface planers and the like to surface finish wood wherein the wood is moved with respect to the blade along a path normal to and offset from the rotation axis of a rotating member containing the blade horizontally disposed at the member's outer periphery in a plane parallel to the member's rotation axis to contact the wood with an elongated cutting edge at the outer edge of the blade, the improvement comprising:
   (a) the elongated blade being hammer-shaped in cross-section and comprising a radial portion with a head portion at its end and at right angles thereto, said head portion including the elongated cutting edge disposed to face in the direction of rotation with a supportive amount of material behind it; and,
   (b) the elongated cutting edge forming a chisel-shaped cutting edge facing in the direction of rotation of the blade which is disposed to contact the wood at an acute angle with respect to the surface of the wood so that as the blade rotates said chisel-shaped cutting edge cuts an elongated arcuate segment from the surface of the wood at the point of contact and said supportive material behind said cutting edge supports said cutting edge to resist breaking and chipping.

8. The improvement to a blade of claim 7 wherein additionally said blade has a burnishing edge along the edge facing opposite the direction of rotation and disposed to contact wood passing by after being cut by said cutting edge, said burnishing edge being positioned to move along a circle of rotation of slightly smaller radius than the circle of rotation of said cutting edge whereby as said blade rotates said burnishing edge smooths any irregularities extending upward from the surface of the wood more than a pre-established minimum amount at the point of contact without contacting the wood's surface sufficiently to cause frictional burning thereof.

9. The improvement to a blade of claim 8 wherein said burnishing edge is formed at the edge of two surfaces meeting at substantially right angles such that contact between said burnishing edge and the wood is along a line point of contact.

10. A blade for use in rotating machinery to shape and surface finish wood wherein the wood is moved through the machinery along a path normal to and offset from the rotation axis of a rotating member containing said blade at its outer periphery to contact the wood, said blade being of a hard, sharpenable material and comprising:
   (a) a radial member carried by and extending radially outward from the rotating member along a line substantially normal to the rotational axis thereof;
   (b) a cutting member carried by said radial member at an outer end thereof to be rotated in a circular path as the rotating member rotates, said cutting member being disposed substantially at right angles to said radial member and having an elongated chisel-shaped cutting edge along the edge facing in the direction of rotation and disposed to contact wood passing by at an acute angle with respect to the surface of the wood whereby as said blade rotates said cutting edge cuts an arcuate segment from the surface of the wood at the point of contact; wherein,
   (c) said cutting member has a burnishing edge along the edge facing opposite the direction of rotation and disposed to contact wood passing by after being cut by said cutting edge, said burnishing edge moving along a circle of rotation of slightly smaller radius than the circle of rotation of said cutting edge whereby as said blade rotates said burnishing edge smooths any irregularities extending upward from the surface of the wood more than a pre-established minimum amount at the point of contact without contacting the wood's surface sufficiently to cause frictional burning thereof.

11. A blade for use in rotating machinery to shape and surface finish wood wherein the wood is moved through the machinery along a path normal to and offset from the rotation axis of a rotating member containing said blade at its outer periphery to contact the wood, said blade being of a hard, sharpenable material and comprising:
   (a) hammer-shaped cutting means for rotation in a circular path as the rotating member rotates and for cutting an arcuate segment from the surface of the wood at the point of contact as said cutting means rotates, said hammer-shaped cutting means having a radial portion with a head portion at its end and at right angles thereto, said head portion including an elongated chisel-shaped cutting edge facing in the direction of rotation with a supportive amount of material behind it and disposed to contact the wood at an acute angle with respect to the surface of the wood whereby as said cutting means rotates said cutting edge cuts an arcuate segment from the surface of the wood at the point of contact and the supportive material behind said cutting edge supports said cutting edge to resist breaking and chipping; and, (b) burnishing means for rotation in combination with said cutting means to contact wood passing by after being cut by said cutting means, said burnishing means being disposed to move along a circle of rotation of slightly smaller radius than the circle of rotation of said cutting means for burnishing and smoothing any irregularities extending upward from the surface of the wood more than a pre-established minimum amount at the point of contact without contacting the wood's surface sufficiently to cause frictional burning thereof.

12. The blade of claim 11 wherein said burnishing edge is formed at the edge of two surfaces meeting at substantially right angles such that contact between said burnishing edge and the wood is along a line point of contact.

* * * * *